United States Patent [19]

Taguchi et al.

[11] Patent Number: 4,918,648
[45] Date of Patent: Apr. 17, 1990

[54] WORD PROCESSING DEVICE CAPABLE OF EDITING MANY DISTINCT DOCUMENTS USING A SINGLE SELECTION PROCESS

[75] Inventors: Yasuhiro Taguchi; Hiroichi Yoshida, both of Yamatokoriyama, Japan

[73] Assignee: Sharp Kabushiki Kaisha, Osaka, Japan

[21] Appl. No.: 239,010

[22] Filed: Aug. 29, 1988

Related U.S. Application Data

[63] Continuation of Ser. No. 818,710, Jan. 14, 1986, abandoned.

[30] Foreign Application Priority Data

Jan. 25, 1985 [JP] Japan .................................. 60-13115

[51] Int. Cl.4 ........................... B41J 5/30; G06F 3/00
[52] U.S. Cl. .................................... 364/900; 364/943; 364/943.1; 364/943.43; 364/943.44; 400/63
[58] Field of Search ... 364/200 MS File, 900 MS File; 400/63

[56] References Cited

U.S. PATENT DOCUMENTS

| 3,654,611 | 4/1972 | Bluethman et al. | 364/200 |
|---|---|---|---|
| 3,810,107 | 5/1974 | Goldman et al. | 364/200 |
| 3,848,232 | 11/1974 | Leibler et al. | 364/200 |
| 3,980,994 | 9/1976 | Ying et al. | 364/200 |
| 4,057,849 | 11/1977 | Ying et al. | 364/200 |
| 4,075,695 | 2/1978 | Lelke | 364/200 |
| 4,193,112 | 3/1980 | Gilbert et al. | 364/200 |
| 4,195,353 | 3/1980 | Abe et al. | 364/900 |
| 4,435,777 | 3/1984 | McCaskill et al. | 364/200 |
| 4,454,576 | 6/1984 | McInroy et al. | 364/200 |
| 4,498,147 | 2/1985 | Agnew et al. | 364/900 |
| 4,513,391 | 4/1985 | Maddock | 364/900 |
| 4,553,860 | 11/1985 | Imaizumi et al. | 364/900 |
| 4,651,300 | 3/1987 | Suzuki et al. | 364/900 |

Primary Examiner—Eddie P. Chan
Assistant Examiner—Kevin A. Kriess

[57] ABSTRACT

A word processing device comprising a keyboard containing character input keys and sentence editing control keys; a display unit for displaying word data input from the keyboard for preparing sentence; a storage in which sentences are registered; a memory for storing partial word data picked up from one or a plurality of sentences registered in the storage; and an input key for calling up the partial word data retained in the memory. In response to a call-up instruction by the input key, required partial word data is taken out of the memory and inserted in a desired position of the presently edited sentence.

7 Claims, 2 Drawing Sheets

WORD PROCESSING DEVICE CAPABLE OF EDITING MANY DISTINCT DOCUMENTS USING A SINGLE SELECTION PROCESS

This application is a continuation, of application Ser. No. 06/818,710 filed on Jan. 14, 1986, now abandoned.

BACKGROUND OF THE INVENTION

The present invention relates to a word processing device such as a word processor and, more specifically to a word processing device provided with a word replacement or insertion function to pick up particular words from various sentences previously registered and retained in storage and insert them in desired positions of the presently edited sentences.

In preparing a document with a word processing device, the operator is sometimes required to insert particular words picked up from previously registered sentences into the sentences being currently edited.

To conduct such insertion with an apparatus in the prior art, the operator must (1) list up the names of the registered sentences on a display unit, (2) select a desired registration name from among the list, (3) call up the sentence registered under the selected registration name to be presented on the display unit, and (4) erase all the words other than necessary ones for insertion.

Accordingly, if particular words are to be picked up from a plurality of registered sentences and inserted in the presently edited document, the above steps (1) through (4) are repeated for each registered sentence in order to complete a desired document.

However, it may be necessary to repeatedly use the particular words picked up from a plurality of registered sentences (PASTE word data), in completing different documents. In such a case, the operator must repeat the steps (1) through (4) for each of the plurality of registered sentences in preparing each of the documents, which is quite troublesome and inefficient.

SUMMARY OF THE INVENTION

It is the object of the present invention to provide a word processing device free from the above-mentioned problem of the apparatus in the prior art. More specifically, the object of the present invention is to provide a word processing device with a function that enables particular word data picked up from one or more registered sentences to be inserted by simple operation into the sentences of different documents, thereby facilitating efficient document preparation.

Other objects and further scope of applicability of the present invention will become apparent from the detailed description given hereinafter. It should be understood, however, that the detailed description and specific examples, while indicating preferred embodiments of the invention, are given by way of illustration only; various changes and modifications within the spirit and scope of the invention will become apparent to those skilled in the art from this detailed description.

To achieve the above objects, a word processing device according to a preferred embodiment of the present invention comprises a keyboard containing character input keys and sentence editing control keys; a display unit for displaying word data input from the keyboard; a storage in which sentences are registered; memory means for storing partial word data picked up from one or a plurality of sentences registered in the storage; and input means for calling up the partial word data retained in the memory means so that, in response to a call-up instruction from the input means, required partial word data is taken out of the memory means and inserted in a desired position of the presently edited sentence.

BRIEF DESCRIPTION OF THE INVENTION

The present invention will become more fully understood from the detailed description given hereinbelow and the accompanying drawings which are given by way of illustration only, and thus are not limitative of the present invention and wherein:

FIG. 1 is a block diagram showing the construction of a word processing device of the present invention; and FIGS. 2(A) and 2(B) are flow charts showing picking-up and insertion operation mode of the word processing device of the present invention.

DETAILED DESCRIPTION OF THE INVENTION

Figure 1:
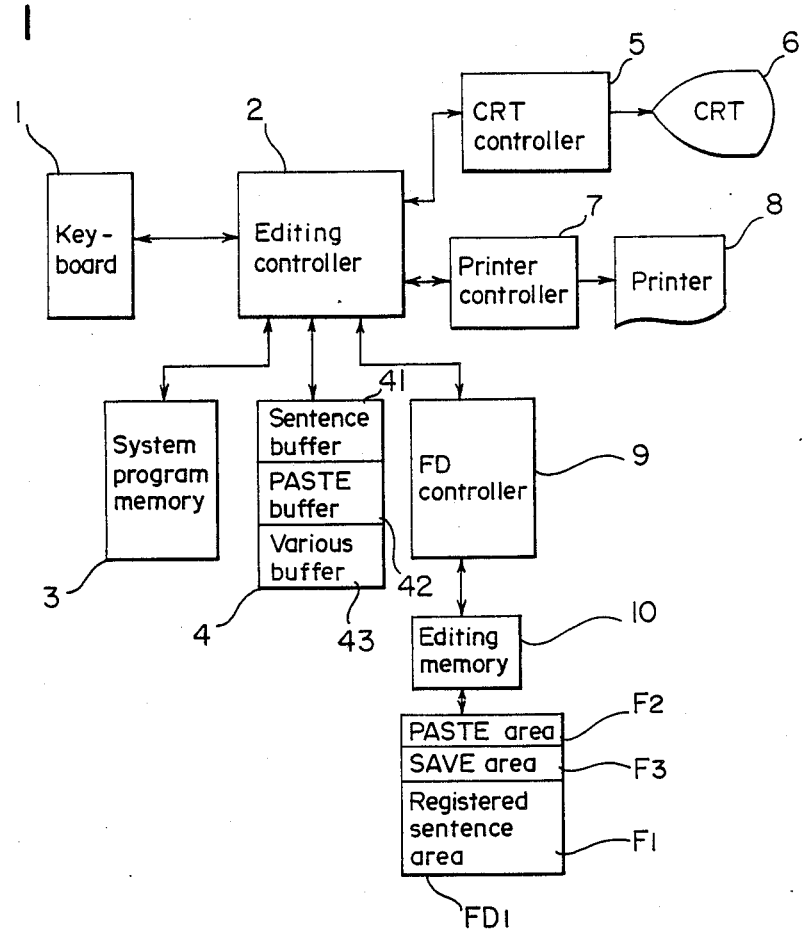

FIG. 1 is a block diagram showing the construction of a word processing device of the present invention.

A keyboard 1 contains character keys for inputting character data and various control keys for sentence edition.

The control keys related to the present invention comprises a PASTE mode selection key, cursor shift instruction keys, display data change instruction key for changing the entire sentence data on the display by pages, execution key for executing each job instructed by the keys, instruction release key, position selecting key for designating a particular position for insertion in sentences, and PASTE data call-up instructing key.

Figure 2B:
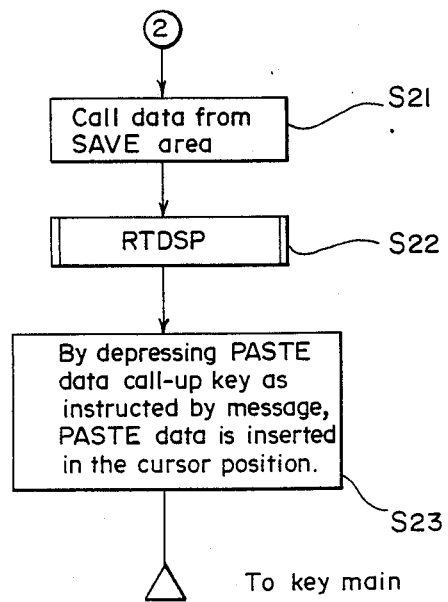
Figure 2A:
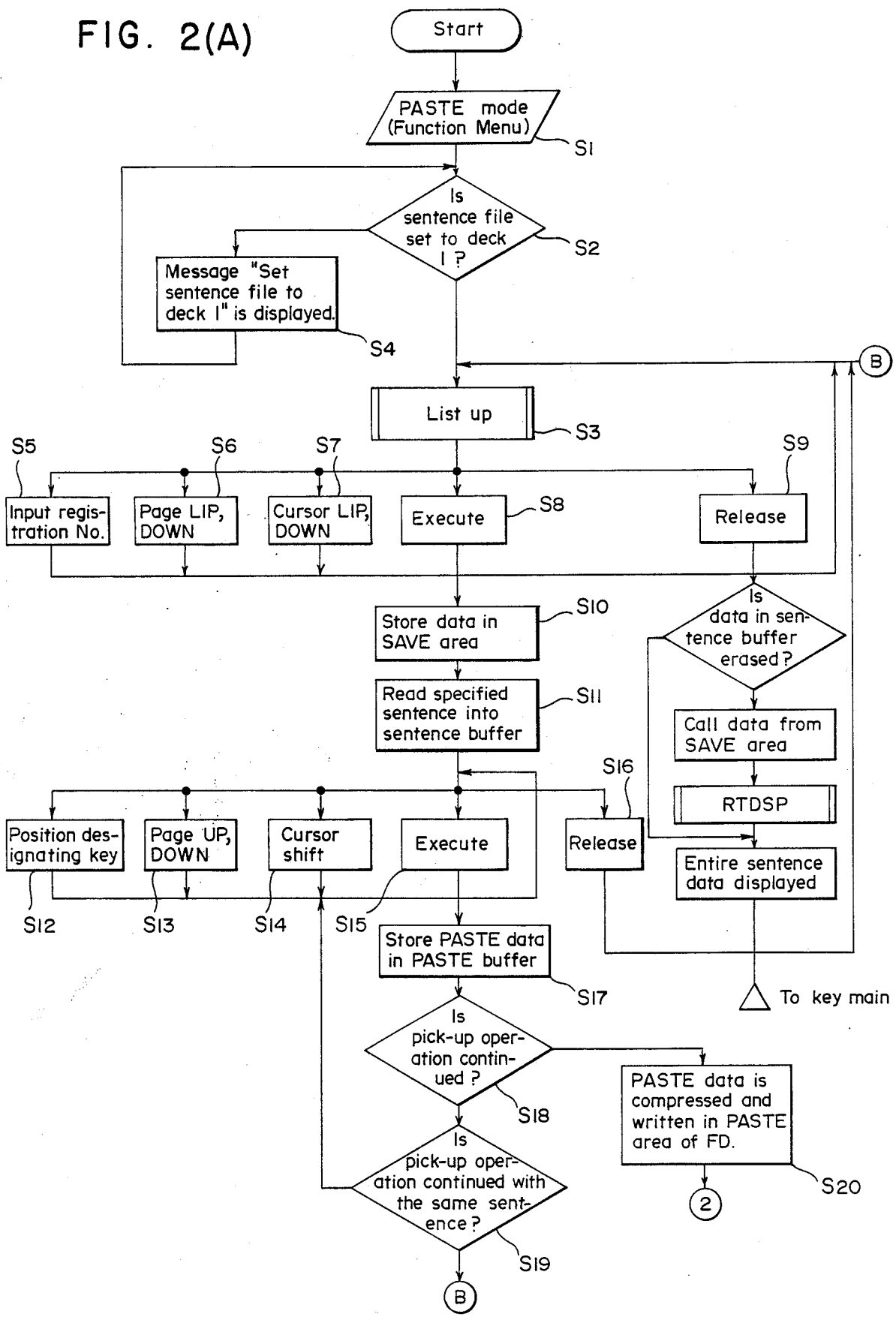

An edition controller 2 controls the editing operation in accordance with the edition controlling system program preliminarily stored in a system program memory 3. The system program is loaded from a system file of a floppy disc unit (FD) when the device is turned ON. The system program contains a program for executing operation as shown in FIG. 2.

Editing memory 4 composed of RAM or similar memory which comprises a sentence buffer 41 for storing presently edited sentence data or registered sentence data read from the floppy disc unit (FD); PASTE buffer 42 for storing PASTE data composed of particular word data picked up from the sentences registered in the sentence file of the floppy disc unit (FD), in the PASTE mode; and an area 43 composed of various buffers and flags for use in the editing operation.

A CRT controller 5 incorporates a display buffer. CRT displays sentence data stored in the sentence buffer 41. A printer controller F and printer 8 are used for printing out the currently edited sentence.

Floppy disk unit (FD) controller 9 and floppy disc unit 10 are used to load system program into the system program memory 3.

The sentence file (floppy disc) FD1 loaded on the floppy disc unit 10 comprises a registered sentence area $F_1$ for registering previously edited sentences, PASTE area $F_2$ for registering PASTE word data, and SAVE area $F_3$. Sentences are registered in the registered sentence area $F_1$ under their respective registration names or numbers. The PASTE area $F_2$ may be contained in a system file.

The word processing device of the present invention is characterized by the PASTE buffer 42 for storing PASTE word data picked up from one or more sentences registered in the sentence file of the floppy disc unit 10 and the PASTE area $F_2$ provided in the sentence file (or system file) for registering PASTE word data.

Now, the operation mode of the word processing device of the present invention is described below with reference to the flow chart of FIG. 2. To prepare desired PASTE word data by picking up particular words from one or more registered sentences, it is necessary to operate the PASTE mode selection key (Step $S_1$ of FIG. 2 (A)).

By this operation, the program checks if the sentence file has been set in the floppy disc unit 10 (Step $S_2$). If the sentence file has been set, the registration names of the sentences registered in the sentence file are listed up on the CRT 6 (Step $S_3$). If the sentence file has not been set, a file-setting instructing message is given on the CRT 6 (Step $S_4$).

When the registration names are listed up, the operator of the word processor selects a desired registration name by the operation of the Steps $S_5$ through $S_7$, and operates the execution key (Step $S_8$). In response to this key operation, the presently edited sentence data retained in the sentence buffer 41 is transferred to the FD controller 9 and stored in the SAVE area $F_3$ of the sentence file (Step $S_{10}$).

Then, the sentence registered under the selected registration name is read from the registered sentence area $F_1$ of the sentence file and sent to the sentence buffer 41 (Step $S_{11}$). The registered sentence data sent to the sentence buffer 41 is now displayed on the CRT 6. Then, the operator of the word processor locates a desired word in the displayed sentence by the operation of the Steps $S_{13}$ and $S_{14}$ and operates position designating key $S_{12}$ to specify the PASTE word data. After specifying the PASTE data by the above operation, the operator of the word processor depresses the execution key (Step $S_{15}$) to transfer only the specified PASTE data to the PASTE buffer 42 (Step $S_{17}$).

To continue this PASTE data pick-up operation with the same registered sentence, the program proceeds to Steps $S_{18}$ and $S_{19}$ and returns to the Steps $S_{12}$ through $S_{14}$ to locate and specify a desired PASTE word data which is transferred to the PASTE buffer 42 by the Steps $S_{15}$ and $S_{17}$.

To pick up PASTE word data from another registered sentence, the program returns from the Step $S_{19}$ to the Step $S_3$ to repeat the above routine. That is, a desired registered sentence is transferred to the sentence buffer 41 so that a desired PASTE word data is specified and sent to the PASTE buffer 42.

Thus, the PASTE word data picked up from one or more registered sentences are stored in the PASTE buffer 42 so that the required PASTE data is obtained. When the required PASTE data is completed, the program proceeds from the Step $S_{18}$ to the Step $S_{20}$ where the PASTE data is transmitted from the PASTE buffer 42 to the FD controller 9 and written in the PASTE area $F_2$ of the sentence file.

The program then proceeds to the Steps $S_{21}$ of FIG. 2 (B) where the presently edited sentence data temporarily stored in the SAVE area $F_3$ of the sentence file is taken out and returned to the sentence buffer 41. The presently edited sentence is then displayed on the CRT 6 (Step $S_{22}$). By depressing the PASTE word data call-up instructing key, the PASTE word data is inserted at a desired position designated by the cursor in the presently edited sentence.

According to the present invention, as described above, PASTE data is stored in the PASTE area $F_2$ of the sentence file. Therefore, to edit another different document using the PASTE data already stored in the PASTE area $F_2$, simply depress the PASTE data call-up instructing key to transfer the PASTE data from the PASTE area $F_2$ to the sentence buffer 41. Then, the PASTE word data is inserted in a desired position specified by the cursor in a currently prepared document.

That is, the PASTE word data prepared for a document can be used for insertion in desired positions of the sentence of other documents, simply by giving a PASTE data call-up instruction.

As understood from the above, the word processing device of the present invention is equipped with the memory means for storing PASTE data obtained by picking up particular words from one or more registered sentence, so that the PASTE word data is taken out of the memory means for insertion in the sentence, only by a call-up instruction. Thus, efficient document preparation with simple word insertion operation is achieved by the present invention.

As a modification, the PASTE buffer for storing PASTE word data and the PASTE area of the sentence file may be installed in plural number. The PASTE data call-up instruction means may be provided in plural number corresponding to the plurality of PASTE buffers or PASTE areas.

While only certain embodiments of the present invention have been described, it will be apparent to those skilled in the art that various changes and modifications may be made therein without departing from the spirit and scope of the present invention as claimed.

What is claimed is:

1. A word processing device comprising:

keyboard means for supplying input characters and sentence editing control signals;

input means for providing a call-up signal;

storage means, responsive to said sentence editing control signals from said keyboard means, for storing predetermined registered sentences and releasing selected registered sentences;

sentence buffer means, responsive to said sentence editing control signals from said keyboard means, for storing the selected registered sentences released from said storage means;

paste buffer means, responsive to said sentence editing control signals from said keyboard means, for storing partial word data selected from one or more of the selected registered sentences in said sentence buffer means to be used in editing one or more distinct documents;

said paste buffer means, being further responsive to said call-up signal, for calling up said partial word data one or more times from said paste buffer means to allow the word processing device to edit one or more distinct documents with the selected partial word data without requiring re-selection and storing of the selected partial word data;

display means, responsive to said keyboard means and said sentence buffer means, for displaying said characters from said keyboard means and the selected registered sentences from said sentence buffer means; and editor controller means, responsive to said call-up signal produced by said input means, for inserting said partial word data into a desired position of a presently edited document, said desired position being a different position in each document;

said keyboard means providing said editor controller means with additional data not stored in said paste buffer means;

said editor controller means inserting said additional data into a desired position of said presently edited document, thereby causing said presently edited document to be modified by the data stored in said paste buffer means and by said additional data provided by said keyboard means.

2. The word processing device as claimed in claim 1, wherein said storage means further comprises:

floppy disk controller means, responsive to said sentence editing control signals from said keyboard means, for regulating the release of said selected registered sentences;

floppy disk drive means, responsive to said floppy disk controller means, for reading said predetermined registered sentences from a floppy disk.

3. The word processing device as claimed in claim 1 further comprising:

printing means, responsive to said sentence editing control signals from said keyboard means, for producing a printed copy of said presently edited document.

4. A method of using a word processing device for editing one or more documents comprising the steps of:

(a) listing up registration names of registered sentences;

(b) selecting desired registration names from the registration names of said step (a) to determine selected registered sentences for editing;

(c) choosing desired partial data words from the selected registered sentences;

(d) storing the desired partial data words in a paste buffer;

(e) determining when said step (c) is complete;

(f) writing the desired partial data words of the paste buffer into a paste area when said step (c) is complete;

(g) calling-up the documents to be edited;

(h) inserting the desired partial data words of the paste area into a desired position of each of the documents without repeating said steps (a)–(f), said desired position being a different position in each document; and (i) inserting additional data from an input device, into another desired position of each document, wherein the data is not stored in the paste area, thereby editing the document by inserting data from the paste area and additional data from the input device.

5. The method as claimed in claim 4, wherein said selecting step (b) further comprises:

(j) storing previously stored data from a sentence buffer in a save area;

(k) storing the selected registered sentences in the sentence buffer; and (l) displaying the selected registered sentences on a cathode ray tube.

6. The method as claimed in claim 4, wherein said determining step (e) further comprises:

(j) determining when new selected registered sentences are desired if said step (c) is incomplete;

(k) repeating said step (c) if new selected registered sentences are not desired; and (l) repeating said step (a) if new selected registered sentences are desired.

7. The method as claimed in claim 4, wherein said step (a) further comprises:

(j) displaying the document to be edited on the cathode ray tube.

* * * * *